Jan. 2, 1968   H. GUGENHAN ETAL   3,361,217
MACHINE FOR THINNING OUT ROWS OF PLANTS
Filed Jan. 15, 1965   5 Sheets-Sheet 1

Inventor:
HEINRICH GUGENHAN &
ARNOLD GEGO
BY Mason, Fenwick & Lawrence
ATTORNEYS

Fig. 15

United States Patent Office 3,361,217
Patented Jan. 2, 1968

---

3,361,217
MACHINE FOR THINNING OUT ROWS OF PLANTS
Heinrich Gugenhan, 53 Schulstrasse, Duren, Germany, and Arnold Gego, Gut Scheuer, Laurensberg, near Aachen, Germany
Filed Jan. 15, 1965, Ser. No. 425,864
Claims priority, application Germany, Jan. 17, 1964, F 41,765
10 Claims. (Cl. 172—94)

ABSTRACT OF THE DISCLOSURE

A row crop thinning machine having plural hydraulically driven rotating discs rotating about an axis parallel to the crop row and having pivotally mounted hoes extending radially to engage the row with selectively actuable slide means mounted in the disc and operable to cause the does to pivot upwardly to a position parallel to the axis of disc rotation as the hoes descend toward a row so that the hoes do not engage the row.

---

This invention relates to a machine for thinning out rows of plants, comprising at least one rotating tool disc provided with concentrically and radially arranged hoeing tools which are able to pivot perpendicularly of the plane of rotation of the tool disc between end positions located radially of and parallel to the axis of rotation of the tool disc.

Machines of this type are known by means of which a certain number of plants may be removed at regular intervals from the rows in which they are arranged in order not to interfere with the growth of the remaining plants. But, the known machines suffer from a number of disadvantages.

Thus, the known machines are of very considerable size on account of the design of their mechanism for pivoting the hoeing tools. This considerable space requirement precludes a small and compact design of the tool discs, in consequence of which the discs cannot be adapted to thin out several juxtaposed rows of plants at the same time. In addition, the design of their mechanism for pivoting the hoeing tools very considerably increase the weight of the known machines. Moreover, again on account of the design of their mechanism for rotating the hoeing tools, the known machines are very complex and unreliable.

In the known machines, the tool discs are driven mechanically by wheels in contact with the ground or by the power take-off of the tractor on which they are mounted. Such a mechanical drive is, however, very complicated in the particular case of machines fitted with a plurality of tool discs for the simultaneous cultivation of a corresponding number of rows. Apart from this, it presents considerable difficulties when it is desired to alter the distances between the tool discs.

The object of the invention is to provide a machine for thinning out rows of plants which does not suffer from the disadvantages of the known machines and which even has additional advantages over them.

In the machine according to the invention, each hoeing tool is pivoted by means of a slide axially displaceable on the tool disc. The hoeing tools are pivotally connected to the slides and means are provided to lock and displace the slides. According to the invention, the means for locking the slides consist of locking pawls which are adapted to be engaged in or released from the slides and which are arranged on the tool disc. The means for displacing the slides inside the tool disc consist of a curved member or of a swash plate with which the slides engage when released.

This design of the means for pivoting the hoeing tools not only considerably reduces the diameter of the tools disc or discs it also makes them compact. In addition, it reduces the weight of the machine and increases its reliability.

According to the invention, the drive of the new machine is improved in relation to the known machines in that each tool disc is driven by a hydraulic, pneumatic or electric system, or by combinations of these three systems. in dependence upon the course or speed of the machine. According to the invention, a control device into which the course or speed of the machine is fed as an input value, is provided for the drive of the tool discs in dependence upon the course or speed of the machine. In addition, the control device is provided according to the invention with means for limiting the drive of the tool discs to an upper rotational speed.

According to the invention, it would even be possible for each tool disc in the new machine to be driven at a constant rotational speed by a hydraulic, pneumatic or electric system, or by combinations of these three systems, in which case the rotational speed may be set at such a value that an optimum hoeing length is obtained for each hoeing tool.

According to the invention, hydraulic drive is preferred. If there are a number of hydraulically driven tool discs, their driving motors are arranged in series, according to the invention.

If the tool disc or discs is/are hydraulically driven, an oil flow governor is preferably provided according to the invention through which oil is supplied to the driving motor or motors and which prevents the supply of oil from becoming excessive or keeps it at a constant level.

In order to swing the hoeing tools out of their radial working position when it is desired to leave a particular plant standing, it is necessary to actuate the locking pawls acting on the slides which are pivotally connected with the hoeing tools. For this purpose, the invention provides the new machine with a control arm operable by means of a magnet. The arrangement is such that the pawls by which the slides are locked are released from them under the action of the magnet via the control arm when the machine has travelled a certain distance and the presence of a plant has been detected by a feeler.

Further features and advantages of the machine according to the invention will become apparent from the following description and from the accompanying drawings of various embodiments, wherein.

The machine shown in the drawings comprises a frame 1 which consists of a lower horizontal support 2, two uprights 3 and 4 spaced apart, an upper horizontal support 5 and an upper central upright 6. The machine may be coupled to a tractor (not shown) by means of the frame 1.

The machine is supported on the ground by wheels 7, 8. These wheels 7, 8 are mounted in forks 9, 10 which are mounted for rotation in vertical bearing sleeves 13, 14 by means of upper bolts 11, 12. The vertical bearing sleeves 13, 14 are arranged on the front of the frame 1 and are connected to the lower support 2 by stays 14a.

Figure 1:
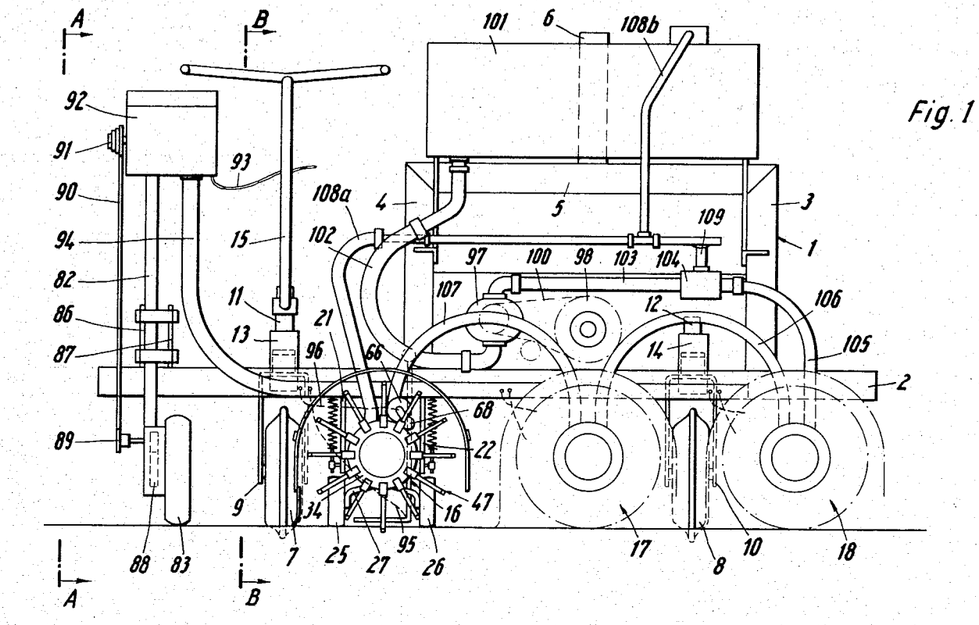
FIGURE 1 is a rear view of a machine according to the invention.
Figures 2, 3:
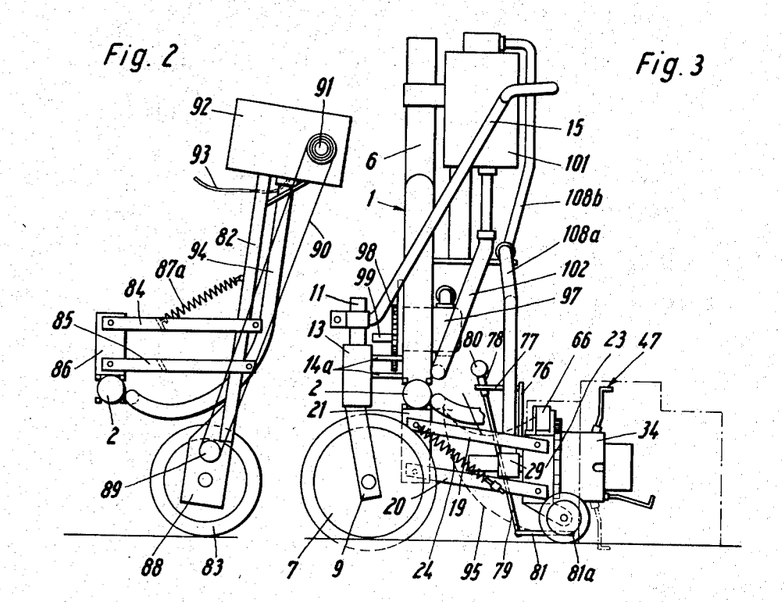
FIGURE 2 is a side elevation of the same machine on the line A—A of FIGURE 1, various parts having been omitted.
FIGURE 3 shows the same machine partly in elevation and partly in section on line B—B of FIGURE 1.
Figures 4, 8:
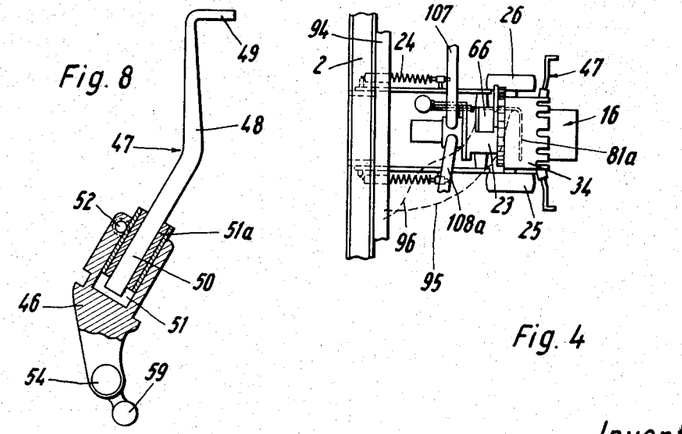
FIGURE 4 is a plan view of a tool unit of the machine shown in FIGURE 1.
FIGURE 8 shows part of a hoeing tool and its holder as used in the machine shown in FIGURE 1, seen partly in elevation and partly in longitudinal section.

As shown in FIGURE 1, a steering rod 15 is arranged at the upper end of the bolt 11 of the left-hand fork 9. In addition, the bolts 11, 12 of the two forks 9, 10 are connected together by means of a steering linkage (not shown). If, therefore, the fork 9 is turned by means of the steering rod 15, the fork 10 is also turned, thus enabling the machine to be guided.

Mounted at the back of the frame 1 are three hoeing units 16, 17 and 18, of which only the unit 16 is shown in detail in FIGURE 1. The design of the hoeing units is apparent not only from FIGURE 1, but also from FIGURES 3, 4, 5 and 8.

The hoeing unit 16, 17, 18 are connected with the frame 1 by means of toggle levers 19, 20 arranged in the form of a parallelogram. The ends of the levers 19, 20 nearer the frame are secured to stays 21, 22 which extend vertically downwardly at a distance from the support 2. In contrast, the ends of the levers 19, 20 nearer the units are secured to the housing 23 of the units. The units are resiliently suspended by means of helical springs 24 which extend from that end of the upper toggle lever 19 nearer the frame, terminating at a short distance from that end of the lower toggle lever 20 nearer the unit.

The hoeing units 16, 17, 18 are supported on the ground by means of wheels 25, 26. The wheels 25, 26 are mounted on a support 27 which is mounted to swivel on the underneath of the housing 23 by means of a pivot bolt 28 extending in the direction of travel.

Anchored to the front of the housing 23 accommodating the units 16, 17, 18 is a hydraulic motor 29. The end 30 of the driving shaft of this motor 29 extends into the housing. Mounted in the housing 23 and in a hub 31 which adjoins the back of the housing is another driving shaft 32. The driving shaft 32 is connected to the end 30 of the other driving shaft by means of a coupling 33.

The driving shaft 32 extends in a rearward direction beyond the rear end of the hub 31. Arranged on the projecting end of the shaft 32 is a tool disc 34. The tool disc 34 is keyed to the shaft 32 so as to rotate with it. In order that the tool disc 34 may be secured to the shaft 32, the rear end of the shaft is provided with a screw thread 35, a cap 36 and nuts 37, 38.

The tool disc 34 is cup-shaped and extends from the rear end of the shaft 32 towards the housing 23, surrounding the hub 31. Its front edge surrounds an annular flange 40 arranged on the back of the housing 23.

Figure 5:
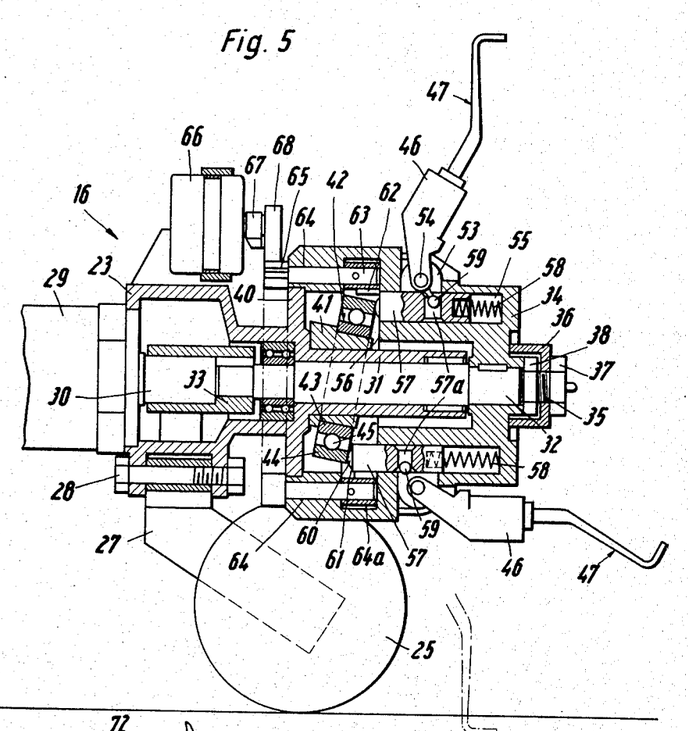
FIGURE 5 is a vertical longitudinal section through a tool unit of the machine shown in FIGURE 1.

Arranged in the space confined by the tool disc 34 on the hub 31 by means of an intermediate ring 41 is a swash plate 42 which consists of a roller bearing with an inner ring 43, an outer ring 44 and rollers 45. By virtue of the shape of the intermediate ring 41, the upper end of the swash plate 42 is inclined to the right relatively to the vertical (FIGURE 5).

Arranged concentrically and radially in holders 46 on the periphery of the tool disc 34 are several hoeing tools 47 which comprise a shank 48, the outer end of which is bent to form a blade 49. The other end 50 of the tool shank 48 is inserted into a cylindrical bore 51 formed in the outer end of its holder 46. The tool 47 is resiliently mounted in the holder 46 by means of an annular block 51a of rubber arranged between the outer surface of the end 50 of the shank and the inner surface of the bore 51. The end 50 of the shank is firmly locked in the holder 46 by means of a screw-threaded nut 52.

In order to receive and mount the tool holders 46, the tool disc 34 is provided around its periphery with bearing elements 53 on which the holders 46 are so mounted as to pivot about bolts 54 perpendicularly to the plane of rotation of the tool disc 34.

The tool disc 34 is internally formed with a number of cylindrical bores 55 corresponding to the number of hoeing tools 47. The bores 55 extend parallel to the shaft 32 from a central shoulder 56 in the tool disc 34, terminating at a short distance from its rear end. The bores 55 are arranged opposite the bearing elements 53 for the tool holders 46 and are slightly offset radially inwards relative to the bearing elements. In other respects, the arrangement is such that the space confined by the bearing elements 23 communicates freely with the bores 55.

Arranged for longitudinal displacement in each of the bores 55 is a slide 57. Also arranged in the bores 55 between the inner ends of the slides and the ends of the bores are compression springs 58 which tend to urge the slides 57 out of the bores 55. These slides 57 are centrally formed with a transversely extending recess 57a. These recesses 57a are engaged by the spherical end of a finger 59 of the associated holder 46. Consequently, in the event of longitudinal displacement of the slides 57, the tool holders 46 and hence the tools 47 are able to pivot about the bolts 54.

The front ends of the slides 57 are provided with a central convex projection 60 which is surrounded by a flat circular part 61. The convex projection 60 enables the slides 57 to engage the outer ring 44 of the roller bearing forming the swash plate 42. In contrast, the flat circular part 61 forms the abutment for a stop 62 of a locking pawl 63 by means of which the slides 57 may be held in their bores 55 against the action of the springs 58.

One pawl 63 is provided for each slide 57. The pawls 63 are arranged in bores 64 formed in the tool disc 34 which extend parallel to the slides 57 but which are slightly offset radially outwards relative to them. The stops 62 of the pawls 63 are arranged in an inner circular groove 64a formed in the tool disc 34 in which they are able to pivot to a limited extent. Those ends of the pawls 63 opposite the stops 62 project beyond the tool disc 34. Their projecting ends are provided with laterally extending lever arms 65 by means of which the pawls may be rotated back and forth to a limited extent in their bores 64, as a result of which the slides 57 may be released by the stop 62 and then locked in position again.

The pawls 63 and their lever arms 65 are operated by a rotary magnet 66 which is secured to the top of the housing 23. Provided at the rear end of the rotary magnet 66 is a swinging arm 67 carrying a roller 68, by means of which the swinging arm 67 rides on the lever arms 65 of the pawls 63. If the rotary magnet 66 is operated, the swinging arm 67 together with the roller 68 are moved downwards. This causes those pawls 63 of which the lever arms 65 engage the roller 68 when the tool disc 34 is rotated, to rotate in such a way that the stop 62 of the pawls 63 releases the associated slide 57.

When released, the slides 57 contact the outer ring 44 of the swash plate 42 by means of the convex projections 60, and, in doing so, move out of their bores 55 under the action of the springs 58 as far as the swash plate 42 will allow. At the same time, the hoeing tools 47 are swung out of their working position located radially of the axis of rotation, into their inoperative position located parallel to the axis of rotation, as shown in FIGURE 5, in order to leave certain plants standing. The springs 58 are so powerful that they are able to overcome the centrifugal force of the hoeing tools 47 and of their holders 46 when the tool disc 34 is rotated.

When the slides 57 are moved along the swash plate 42 out of their lower position into their upper position, they are again forced into their bores 55. If the rotary magnet 66 is no longer in operation, the stop 62 of the pawls 63 automatically come to rest again behind the circular surface 61 of the slides 57 and locks them in position inside the bores 55, as a result of which the hoeing tools 47 are also returned to their radial position relative to the axis of rotation.

Figure 6:
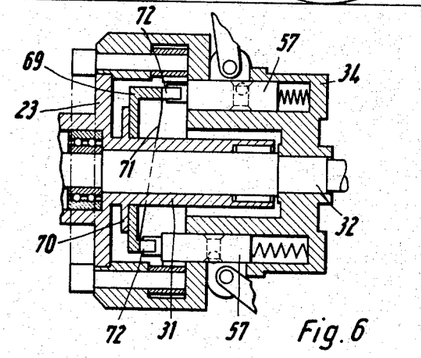
FIGURE 6 is a partial vertical longitudinal section through a tool unit of another machine according to the invention.

The hoeing unit shown in FIGURE 6 corresponds substantially to the hoeing unit shown in FIGURE 5, except that, in place of a swash plate 42, it comprises a curved member 69. This curved member 69 is secured to an annular flange 70 of the hub 31 of the housing. Its rear edge 71 is located in a plane, the upper part of which is inclined towards the right relative to the vertical (FIGURE 6). The rear edge 71 of the curved member 69 forms a curved path for the outer ends of the slides 57. In order that they may move along this curved path 71, the slides 57 are provided with rollers 72 at their ends. In other respects, the co-operation between the slides 57 and the curved member 69 is the same as the co-operation between the slides 57 and the swash plate 42 in the case of the unit shown in FIGURE 5.

Figure 7:
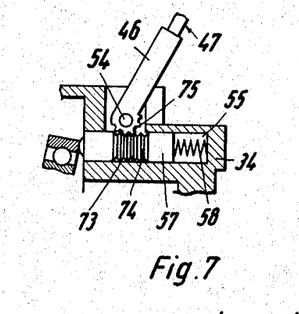
FIGURE 7 is a partial vertical longitudinal section through a tool unit of yet another machine according to the invention.

FIGURE 7 shows part of a hoeing unit which is distinguished from the units shown in FIGURES 5 and 6 by a different type of engagement between the tool holders 46 and slides 57. In the case of this unit, the slides 57 are centrally formed at regular intervals around their peirphery with parallel grooves 73 and hence parallel rings 74. Meshing with these grooves 73 and rings 74 is a toothed segment 75. In the event of longitudinal displacement of the slide 57 in the bore 55, the engagement between the toothed segment 75 and the grooves 73 and the rings 74 causes the tool holders 46 and their pawls 47 to pivot about the bolts 54.

A rod 76 extends upwards from the front of the housing 23 of each hoeing unit 16, 17, 18. The upper end of this rod 76 is adjoined by another frontwardly extending rod 77, the front end of which is provided with a bearing sleeve 78 which slopes backwards. Displaceably mounted in the bearing sleeve 78 is a feeler rod 79, the upper end of which is provided with a knob 80 by means of which it is normally supported on the upper end of the sleeve 78. The lower end of the feeler rod 79 is adjoined by a feeler member 81 which comprises a part 81a located beneath the hoeing units 16, 17, 18 transversely of the direction of travel. By virtue of the displaceable arrangement of the feeler rod 79 in the sleeve 78, the feeler member 81 is able to follow irregularities in the ground and may even be pulled upwards by means of the knob 80.

Provided laterally of the hoeing units 16, 17 and 18 and, as shown in FIGURE 1, at the left-hand end of the support 2, is a device for the electric control of the rotary magnet 66 of the hoeing unit. This device comprises a support 82 to the lower end of which a wheel 83 in contact with the ground is fitted, and which is secured to upwardly directed stays 86, 87 of the support 2 by means of toggle levers 84, 85. Provided between the support 82 and the toggle lever 84 is a tension spring 87a of which the lower end is anchored to a the centre part of the toggle lever 84, whilst its upper end is connected above the lever 84 to the support 82.

A gear 88 is arranged on the wheel 83. This gear 88 drives a pulley 89 around which is laid a driving belt 90 which extends to a stepped pulley 91. The pulley 91 is provided on a control box 92 arranged at the upper end of the support 82. The control box 92 contains electric circuit elements which are supplied with current through a cable 93. A cable 94 extends downwards from the control box 92 and along the support 2. The cable 94 has wires 95 connected to the feeler members 81 of the units 16, 17 and 18, and pairs of wires 96 connected to the rotary magnets 66 of each unit.

By operation of the circuit elements accommodated in the box 92 by the wheel 83 and the feeler members 81, the rotary magnets 66 of the units 16, 17, and 18 are actuated when the machine has travelled a certain distance and the presence of a plant has been detected by the feeler members 81.

The hydraulic motors 29 of the hoeing units 16, 17 and 18 are operated by oil under pressure. To this end, an oil pump 97 is provided which is fixed to the machine frame 1. The oil pump 97 is driven by a gear 98 which in turn is driven via a shaft 99 from a power-take-off of the tractor hauling the machine. The driving movement is transmitted from the gear 98 to the pump 97 by a chain drive 100.

Arranged at the upper end of the frame 1 is an oil tank 101. A pipe 102 leads from this oil tank 101 to the suction side of the pump 97. The delivery side of the pump 97 is adjoined by a pipe 103 which leads to a box 104 which accommodates an oil flow governor and a relief valve. The box 104 is adjoined by a pipe 105 which leads from the oil flow governor to the inlet end of the motor 29 of the hoeing unit 18. The outlet end of the motor 29 of the unit 18 is connected with the inlet end of the motor 29 of the unit 17 by another pipe 106. The outlet end of the motor 29 of the unit 17 is similarly connected with the inlet end of the motor 29 of the unit 16 by a pipe 107. The outlet end of the motor 29 of the unit 16 is adjoined by a return pipe 108a and a return pipe 108b which return the oil under pressure to the oil tank 101. Another pipe 109 leads from the oil flow governor and the relief valve accommodated in the box 104 to the return pipes 108a, 108b so as to return any oil passing not through the governor into the pipe 105 back to the oil tank 101.

Figure 11:
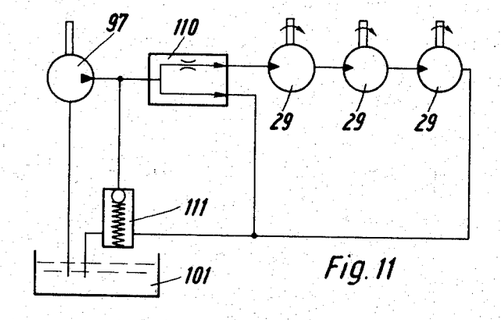
FIGURE 11 is a diagrammatic illustration of another hydraulic drive for the tool discs of a machine according to the invention.
Figure 12:
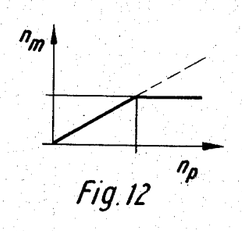
FIGURE 12 is a diagram of the drive shown in FIGURE 11.

Of the diagrammatic illustration of hydraulic drive systems for the tool discs of the hoeing units of machines according to the invention, FIGURES 11 and 12 show the hydraulic driving system used in the machine shown in FIGURE 1. As in FIGURE 1, the oil tank is denoted by the reference 101, the oil pump by the reference 97 and the hydraulic motors by the reference 29. Also shown in FIGURE 11 are an oil flow governor 110 and a relief valve 111 which are accommodated in the box 104 in the case of the machine shown in FIGURE 1. The diagram shown in FIGURE 12 illustrates the interdependence between the rotational speed $n_p$ of the pump 97 and the rotational speed $n_m$ of the motors 29. This diagram shows that the rotational speed $n_m$ is linearly increased up to a specific value of $n_p$ and then maintains a constant value independently of the value of $n_p$ which is caused by the effect of the oil flow governor 110.

Figure 9:
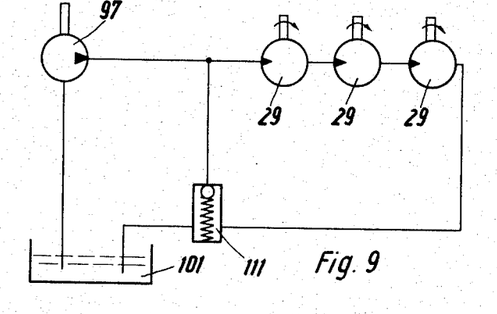
FIGURE 9 is a diagrammatic illustration of a hydraulic drive for the tool discs of a machine according to the invention.
Figure 10:
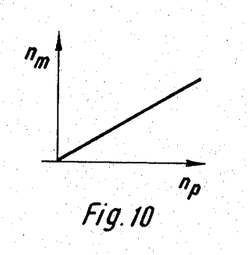
FIGURE 10 is a diagram of the drive shown in FIGURE 9.

The hydraulic driving system shown in FIGURES 9 and 10 corresponds substantially to that shown in FIGURES 11 and 12, except that in this case there is no oil flow governor. The consequence of this is that the rotational speed $n_m$ of the motor increases linearly with the rotational speed $n_p$ of the pump without any limitation, as shown by the diagram given in FIGURE 10.

Figure 14:
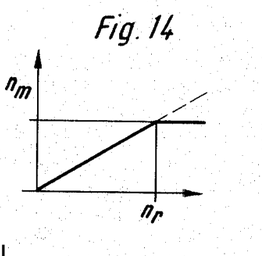
FIGURE 14 is a diagram of the drive shown in FIGURE 13.
Figure 15:
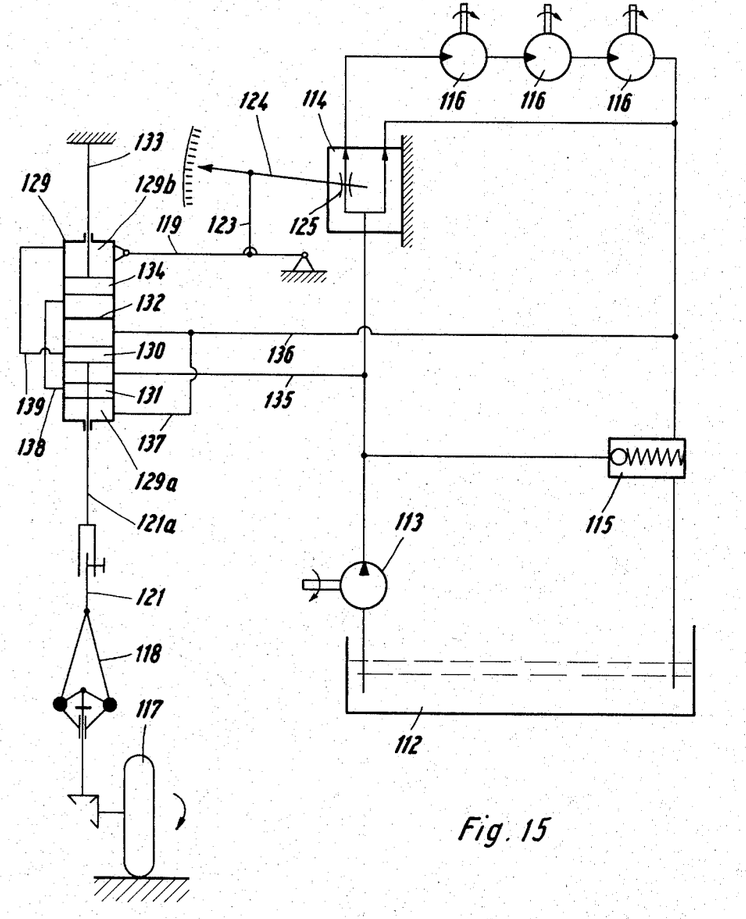
FIGURE 15 is a diagrammatic illustration of yet another hydraulic drive for the tool discs of a machine according to the invention.

The hydraulic driving system shown in FIGURES 9 to 12 are identical in so far as any increase in the rotational speed $n_m$ of the motors is solely dependent on the rotational speed $n_p$ of the pump. This is not the case, however, in the driving systems as shown in FIGURES 13 to 15.

Figure 13:
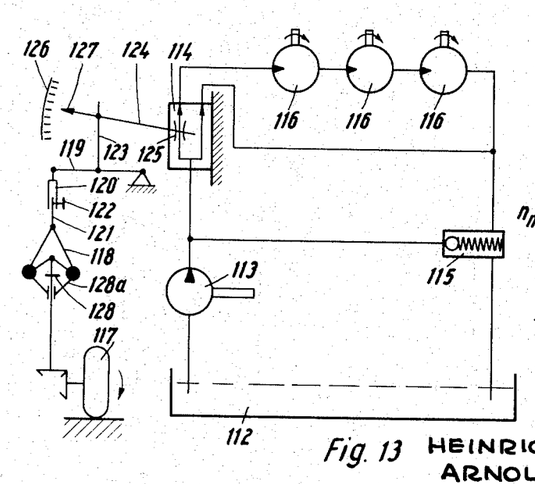
FIGURE 13 is a diagrammatic illustration of another hydraulic drive for the tool discs of a machine according to the invention.

The driving system shown in FIGURE 13 comprises an oil tank 112, an oil pump 113, an oil flow governor 114, a relief valve 115 and hydraulic motors 116, all of which are connected in the same way as their counterparts in the driving system shown in FIGURE 11. However, the oil pump 113 rotates at a preferably constant speed independent of the drive of the tractor hauling the machine, because a separate control unit acting on the oil flow governor serves to drive the motors 116 in dependence upon the course and speed of the machine.

This control unit comprises a wheel 117 which is in contact with the ground and which drives a centrifugal governor 118. This centrifugal governor is connected with the free end of a pivoted lever 119. The connection between the centrifugal governor 118 and the pivoted lever 119 is established by means of a sleeve 120 which is arranged on the pivoted lever 119 and in which an upper rod 121 of the centrifugal governor 118 may adjustably engage. The rod 121 is locked in the sleeve 120 by means of an anchoring nut 122. A control rod 123 extends upwards approximately from the centre of the pivoted lever 119. Linked to the upper end of the control rod 123 is an adjusting rod 124 one end of which acts on a valve 125 of the oil flow governor 114, whilst its other end is in the form of an indicator 127 pointing to a scale 126.

Movement of the adjusting rod 124 by the centrifugal governor 118 causes the valve 125 of the oil flow governor 114 to be opened more or less widely. The extent to which it is opened increases as the speed of the wheel 117 increases in which case the centrifugal governor 118, together with its rod 121, moves upwards. In order to limit the extent to which the valve 125 opens, a stop 128 is provided on the driving shaft of the centrifugal governor 118. Guides 128a of the centrifugal governor come into contact with this stop 128 at a predetermined speed.

FIGURE 14 shows the characteristic curve of the drive shown in FIGURE 13. According to this curve, the rotational speed $n_m$ of the motor increases linearly up to a specific rotational speed $n_r$ of the wheel 117. At this rotational speed, the centrifugal governor 118 has reached its highest position. Consequently, the valve 114 cannot open any further so that, even if the rotational speed $n_r$ of the wheel 117 is increased even further, the rotational speed $n_m$ of the motor does not increase, but remains constant.

The hydraulic drive shown in FIG. 15 corresponds substantially to that shown in FIG. 13, except that it comprises an additional auxiliary hydraulic circuit which works on the follow-up principle with integral states. This auxiliary circuit provides the control device with a greater power of adjustment.

The driving system shown in FIG. 15 also comprises an oil tank 112, an oil pump 113, a relief valve 115, an oil flow governor 114 and oil motors 116. Apart from this, a control unit with a wheel 117, a centrifugal governor 118, a pivoted lever 119, a control rod 123, an adjusting rod 124, and an oil flow valve 125, is provided for this drive.

However, the upper rod 121 of the centrifugal governor is not directly connected to the pivoted lever 119, but comprises an adjustable extension 121a which is introduced upwardly into a cylindrical housing 129 and inside which there are two pistons 130 and 131 spaced apart. The housing 129 is secured at its upper end to the free end of the pivoted lever 119. Arranged approximately in the centre of the housing 129 is a partition 132 by means of which it is subdivided into a lower chamber 129a and into an upper chamber 129b. Extending into the upper chamber 129b of the cylinder 129 is a fixedly arranged rod 133 which is provided inside the cylinder 129 with a piston 134.

Leading from the delivery pipe extending from the pump 113 to the oil flow governor 114, is a branch pipe 135 which opens into the housing 129 substantially in the centre of the chamber 129a. Another branch pipe 136 extends from the upper end of the chamber 129a of the housing 129 to the return pipe which leads from the hydraulic motors 116 back to the oil tank 112. Leading from the pipe 136 is a branch pipe 137 which extends to the lower end of the chamber 129a of the housing 129. Also provided on the housing 129 is a by-pass pipe 138. The lower end of this pipe 138 opens into the chamber 129a at a point located between the points at which the pipes 135 and 137 enter the chamber. In contrast, the upper end of the pipe 138 enters the chamber 129b a little above the partition 132. Apart from this, a further by-pass pipe 139 is provided on the housing 129, the lower end of which opens into the chamber 129a of the housing at a point located between the points at which the pipes 135 and 136 enter the chamber. In contrast, its upper end enters the housing just before the upper end of the chamber 129b.

The method of operation of the auxiliary control circuit of the driving system shown in FIG. 15 consists in that the adjustment of the valve 125 of the oil flow governor 114 is assisted by the oil under pressure delivered by the oil pump 113. This is possible because the oil under pressure flows through the pipe 135 between the pistons 130 and 131. If, now, these pistons move upwards in the event of an increase in the speed of the wheel 117, the by-pass 139 is released by the piston 130. The oil under pressure is then able to enter through this pipe into the chamber 129b of the housing above the piston 134, as a result of which the housing 129 and hence the pivoted lever 119 are moved upwards by the oil under pressure until the inlet opening of the pipe 139 is closed again by the piston 130. Oil is able to flow out of the space below the piston 134 through the by-pass pipe 138, the lower part of the chamber 129a and the return pipes 137, 136. If there is a decrease in the speed of the wheel 117, and if, as a result, the pistons 130, 131 move downwards in the housing 129 to such an extent as to establish a connection between the pipes 135 and 138, oil under pressure enters the space between the piston 134 and the partition 132, as a result of which the housing 129 is moved downwards and the valve 125 closed until the piston 131 again closes the pipe 138. At the same time, oil is able to flow out of the space above the piston 134 along the by-pass pipe 139, the upper part of the chamber 129a and the return pipe 136.

What we claim is:

1. A machine for thinning out rows of plants, said machine comprising at least one rotating tool disc provided with a plurality of concentrically and radially mounted hoeing tools pivotally attached to said disc to pivot about a pivot axis oriented perpendicularly to the axis of disc for rotation between first and second positions respectively firstly oriented in a generally radial position with respect to the rotational axis of said disc and secondly generally parallel to the axis of said disc, a slide associated with each hoeing tool and mounted for reciprocable linear axial movement on said disc, biasing means for biasing one end of each of said slides into engagement with position limiting means oriented at an angle with respect to the axis of disc rotation, pivot means connecting each of said slides to its respective hoeing tool so that rotation of said disc causes each of said slides to reciprocate to pivot its respective hoeing tool as each slide traverses said position limiting means and latch means attached to said disc and actuable to move into engagement with each of said slides to latch each of said slides in a position wherein it cannot be biased into engagement with said positioning means so that pivotal movement of each of said hoeing tools is prevented.

2. The device of claim 1 wherein said latch means comprises a pawl mounted on said disc for movement into and out of holding contact with each slide.

3. The device of claim 1 wherein said position limiting means comprises a swash plate.

4. The device of claim 3 wherein said biasing means comprises spring means.

5. The device of claim 1 wherein said hoeing tools each has a shank portion mounted in a tool holder by means of rubber blocks.

6. The device of claim 1 wherein each rotating tool disc is driven by a hydraulic motor and additionally including a speed control device responsive to the ground speed of the machine to vary the speed of rotation of each of said hydraulic motors.

7. The device of claim 6 wherein said speed responsive means includes a centrifical governor driven by a wheel in contact with the ground.

8. The device of claim 6 wherein said speed responsive means includes an auxiliary control circuit operating on the follow-up principle and includes a slide which is connected to a centrifugal governor for controlling an oil flow valve for controlling the flow of oil to each of said motors.

9. The device of claim 1 wherein each tool disc is driven at a constant speed of rotation by a hydraulic motor and additionally including means for adjusting the disc speed of rotation so as to produce an optimum hoeing length for each hoeing tool.

10. The device of claim 2 additionally including movable control arm means and electromagnetic means for moving said control arm into position to engage successive pawls rotated past said control arm to release the respective slides associated with said successive pawls.

References Cited

UNITED STATES PATENTS

| | | | |
|---|---|---|---|
| 2,507,001 | 5/1950 | Ferte | 172—6 |
| 2,535,720 | 12/1950 | Boncompain | 172—6 |
| 3,012,616 | 12/1961 | Horowitz | 172—94 |

ABRAHAM G. STONE, *Primary Examiner.*

WILLIAM A. SMITH III, *Examiner.*

J. R. OAKS, *Assistant Examiner.*

UNITED STATES PATENT OFFICE
CERTIFICATE OF CORRECTION

Patent No. 3,361,217                  January 2, 1968

Heinrich Gugenhan et al.

It is certified that error appears in the above identified patent and that said Letters Patent are hereby corrected as shown below:

In the heading to the printed specification, lines 3 to 5, for "Heinrich Gugenhan, 53 Schulstrasse, Duren, Germany, and Arnold Gego, Gut Scheuer, Laurensberg, near Aachen, Germany" read -- Heinrich Gugenhan, Duren, Germany, and Arnold Gego, Laurensberg, near Aachen, Germany, assignors, to Georg Gugenhan, trading as H. Fahse & Co., Duren, Germany --.

Signed and sealed this 24th day of June 1969.

(SEAL)
Attest:

Edward M. Fletcher, Jr.                 WILLIAM E. SCHUYLER, JR.
Attesting Officer                      Commissioner of Patents